(12) United States Patent
Furchheim

(10) Patent No.: US 8,677,620 B2
(45) Date of Patent: Mar. 25, 2014

(54) METHOD FOR LINKING ELEMENTS TO HOLLOW SHAFTS, PREFERABLY FOR PRODUCING CAMSHAFTS, AND RESULTING CAMSHAFT

(76) Inventor: Bodo Furchheim, Chemnitz (DE)

(*) Notice: Subject to any disclaimer, the term of this patent is extended or adjusted under 35 U.S.C. 154(b) by 110 days.

(21) Appl. No.: 13/159,207

(22) Filed: Jun. 13, 2011

(65) Prior Publication Data

US 2011/0308487 A1   Dec. 22, 2011

Related U.S. Application Data

(60) Continuation-in-part of application No. 11/653,155, filed on Jan. 12, 2007, now abandoned, which is a division of application No. 10/492,866, filed as application No. PCT/DE02/03745 on Oct. 4, 2002, now Pat. No. 7,322,330.

(30) Foreign Application Priority Data

Oct. 11, 2001 (DE) .................................. 101 50 093

(51) Int. Cl.
*B21D 53/84* (2006.01)

(52) U.S. Cl.
USPC ........................ 29/888.1; 123/90.27; 123/90.6

(58) Field of Classification Search
USPC .................. 29/888.1, 421.1; 123/90.27, 90.6
See application file for complete search history.

(56) References Cited

U.S. PATENT DOCUMENTS 6,006,429 A  * 12/1999  Hanisch et al. .............. 29/888.1
6,438,836 B1 *  8/2002  Barth et al. .................. 29/888.1

* cited by examiner

*Primary Examiner* — Richard Chang
(74) *Attorney, Agent, or Firm* — Berliner & Associates

(57) ABSTRACT

A method for the linking of components to hollow shafts, preferably for producing camshafts, is disclosed where the components, especially cam rings, are manufactured so as to generate their function-related contour, that either a hardenable material is used for this purpose which, aside from its elastic deformability, after hardening still has a permissible plastic deformability of minor extent; or that subsequently the surface of the components, particularly the contact face of the cams, is subjected to a surface-hardening process. These components together with the hollow shaft to be deformed are placed into an IHPF tool in a manner to suit the respective function, and that in a second process step through the application of the IHPF process and due to the internal pressure exerted the components are joined to the hollow shaft in a force- and form-closing manner.

5 Claims, 2 Drawing Sheets

METHOD FOR LINKING ELEMENTS TO HOLLOW SHAFTS, PREFERABLY FOR PRODUCING CAMSHAFTS, AND RESULTING CAMSHAFT

CROSS REFERENCE TO RELATED APPLICATION

This application claims the benefit of and is a continuation in part of patent application Ser. No. 11/653,155, which was filed on Jan. 12, 2007, and a divisional of patent application Ser. No. 10/492,866 which was filed Oct. 18, 2004 and claimed the benefit of PCT/DE02/03745, filed Oct. 4, 2002 which claimed priority of German Application No. 101 50 093.9 filed Oct. 11, 2001. Patent application Ser. Nos. 11/653, 155 and 10/492,866, are hereby incorporated by reference in their entirety.

FIELD OF THE INVENTION

The invention relates to a method for joining components, in particular individual cam rings, with a hollow shaft to form a camshaft produced in conformity with the internal high-pressure forming process (IHPF) process). Furthermore, the invention relates to a hollow shaft on which components, preferably cam rings, are mounted in a force- and form-closing manner. A preferred field of application is the manufacture of camshafts, especially for use in motor-vehicle engines.

BACKGROUND OF THE INVENTION

It is known to produce camshafts according to the IHPF process by placing the hollow shaft and mounted thereon components such as cam rings and drive elements according to their function into an IHPF tool. The internal pressure produced causes the shaft to expand and in this way connect the components with the shaft in a force- and form-closing manner (DE 199 09 184 A1; DE 199 32 810A1). The cam rings as well as other components are manufactured with the help of another process and are sized and possess material properties, i.e. wear resistance, conducive to their subsequent application. Drive elements, for example gearwheels, are attached in the same way. By the application of the IHPF process the shaft first undergoes elastic and then plastic deformation which will result in the components to be accurately fixed and secured.

However, caused by the internal pressure also the component to be mounted, for example the cam ring, will undergo an elastic deformation. The elastic deformation of the cam ring spans the manufacturing tolerances existing between the outer contour of the cam ring and the inner contour of the cam profile of the IHPF tool.

This method of adapting the properties of the cam ring only to its subsequent function is associated with the drawback that the permissible deformation of the cam ring may be exceeded and through the formation of an incipient crack breakage or initial damage may be encountered which during subsequent operation will result in a camshaft failure. This will occur if the cam ring has, for example, been incorrectly heat treated. Consequently, it is to be feared that the damage will only occur after the camshaft has been in use in the engine for a longer period of time. The same may be encountered with gearwheels or other drive elements mounted with the aid of the IHPF process. It has also been determined that a higher risk of breakage exists particularly at the cam ring locations where said ring has suffered maximum stresses during the IHPF process, which is the area ahead of and after the cam tip, especially in the radii transitions and at the cam tip.

SUMMARY OF THE INVENTION

It is, therefore, the object of the invention to provide a method by means of which components, especially cams, are joined according to the known IHPF process on a hollow shaft in a force- and form-closing manner such that the cam rings have an admissible residual expansion of >=0.5% as is required to bridge the expansion of the cam ring and the manufacturing tolerances in the cam ring and/or tool due to the internal pressure. It shall thus be avoided that breakage or incipient damage occurs that may impair a future use, in particular during continuous or long-term operation. The new method shall comprise a combination of processes known per se which are economical and require little expenditure in terms of equipment. A further objective of the invention relates to the provision of a camshaft that is cost-effective, features a high degree of reliability and is suited for use in automotive engines. It shall be made of material of customary quality. Camshafts shall be produced that will cause hardly any consequential damage to the engine.

In accordance with the invention the objective relating to the method for the linking of components to a hollow shaft, preferably a camshaft, is met. Advantageous configurations of the method are described. The objective relating to the camshaft is reached. Further configurations or embodiments are described.

In accordance with the invention the known IHPF process is employed. In a first step of the process the components, in particular the cam rings that are to be joined with the shaft in a force- and form-closing manner, are manufactured so as to attain their form (contour) required for their function. For this purpose a material is employed that after hardening still has a permissible residual expansion of >=0.5%, i.e. in hardened state the material, on its inside and outside and aside from its elastic deformability, may possess to a minor extent a permissible plastic deformability. Most suited for this purpose are low-alloyed steel grades, for example spring steel (58 CrMo V4) that after heat treatment still offers permissible residual expansion characteristics but also has an excellent wear resistance in continuous operation.

These prefabricated cam rings or other components are placed together with the hollow shaft in the IHPF tool in a manner to suit the respective function, and in a second process step said hollow shaft is expanded through axial pressure exerted within the shaft; as a result, the cam rings and/or other components are connected with the hollow shaft in a force- and form-closing manner.

In a second embodiment of the invention the cam rings or components are subjected to surface hardening after they have been manufactured so as to suit their respective function, that is the generation of an outer contour of the cam face and an inner contour. This will enable the outer zones subject to wear to become hard and elastically deformable whereas the inner contour on the cam ring side facing the shaft that due to the exerted internal pressure will expand remains soft to a certain extent, that is will be plastically deformable.

Surface hardening is effected by employing, for example, case hardening, nitriding, induction hardening processes or through the effect of a charge carrier beam.

In one embodiment, surface-hardening the outer surface of the cam rings is achieved in a one step hardening process. The process may involve one of the above hardening techniques applied to either individual cams rings or a tube which thereafter is cut into sections forming cam rings.

In yet another embodiment, a two step hardening process may be applied to surface-harden the outer surface of the cam rings, for instance using conventional two stage heating or induction methods.

In another embodiment, surface-hardening the outer surface of the cam rings may be achieved without using a two step hardening heating or induction process.

In another embodiment of the invention the two methods mentioned above, the manufacture of the cam rings of steel that meets the prerequisites to attain the required residual expansion in the hardened state and the surface hardening of the components or cam rings, are combined in conjunction with the IHPF process. For this purpose, the first process steps in each case are carried out one after the other followed by the second process step.

Another embodiment of the invention provides for the cam ring to comprise of two materials, i.e. on an inner ring consisting of a soft, plastically deformable material a ring made of a hard and elastic material is mounted. Both rings are firmly connected with each other, said connection may, for example, be brought about by press- or shrink-fitting processes. The cam ring thus consists of two zones so to speak, a design arrangement which in the embodiment described earlier is attained by surface hardening.

This design solution can furthermore be varied by providing a dissimilar cam ring thickness, i.e. have an increased thickness in the area of the cam tip. In this way the thickness in the area of the cam tip may be attained by providing an inner ring of varying thickness, i.e. a ring thicker in the area of the cam tip, and an outer ring of uniform thickness or by providing an inner ring of uniform thickness and an outer ring of varying thickness. The outer ring is always hard and resistant to wear.

It may also be expedient for all embodiments of the invention to mount onto the hollow shaft a round symmetrical ring of soft material, expediently similar to that of the hollow shaft or even softer, having the same thickness and mount on this ring the cam ring having its contour formed so as to suit the required function so that by applying the IHPF process the round inner ring is deformed together with the hollow shaft to such an extent that the inner contour of the outer ring, the cam ring, is reached. By means of the IHPF process the hollow shaft, the round ring mounted onto said shaft and the superimposed cam ring are thus connected in a force- and form-closing manner. The outer ring consists of a hard material whose permissible residual expansion is $>=0.5\%$; aside from its elastic deformability said ring must only have a permissible plastic deformability that is of minor extent. However, it is also possible to subject the outer ring to a surface hardening process.

Surprisingly, it has been found that the shortcomings in the state of the art could be eliminated by the cam rings, manufactured and/or treated according to the invention, having characteristics to the effect that the stresses building up in the cam ring as a result of the maximum internal pressure exerted in the course of the IHPF process are lower than those experienced in the known through-hardened cam rings or rings consisting of a material that possesses this hardness throughout.

In the manufacture of the cam rings the impairment mechanism is further alleviated through an appropriate material selection including hardening and heat treatment by surface hardening during which additional internal compressive stresses are created in the hardened layer; in this case the cam rings as well as other components manufactured according to the method will withstand much higher loads and strains.

Significant to all embodiments of the method according to the invention is that the cam ring across its material thickness area has different material characteristics. The top layer which is mechanically strained during operation must be hard and elastically deformable whereas the layer below it has to be deformable both plastically and elastically. This will ensure that even in the event damage occurs no continuous or straight-through cracks can develop but in exceptional cases local damage only. Such spall-off will never result in a sudden destruction of an engine.

The camshaft manufactured according to the inventive method and consisting of an hollow shaft expanded through the application of the IHPF process and onto which cam rings and also other components such as gearwheels or coupling and drive elements are mounted has been joined with the cam rings and other components in a force- and form-closing manner, with said cam rings being made of a material that after a hardening treatment aside from its elastic deformability still has a minor permissible plastic deformability with a surface being hard and wear-resistant.

In a second embodiment the surface of the cam ring has been subjected to a surface hardening treatment applied to a defined thickness. This will render the top layer to be elastically deformable while the layer underneath will be plastically deformable. Both embodiments as they relate to the manufacture of the cam ring may also be combined so as to offer advantages in terms of improved usage properties.

Another embodiment eventually provides that the hard and elastically deformable top layer of the cam ring generated according to the methods first mentioned above is produced in such a manner that it consists of two materials, one hard and elastically deformable and one soft and plastically deformable. Expediently, the connection of these two rings is to be made up before placing them into an IHPF press.

Furthermore, a beneficial design of the camshaft is provided in that the thickness of the cam rings differs in terms of the area of the cam tip being thicker. The zone of the material thickness treated by surface hardening remains equally thick over the entire circumference of the cam ring.

The method according to the invention may also be employed for other applications or the manufacture of other products, that is in all cases where components or elements have to be joined in a force- and form-closing manner with a thin-walled tube by means of the IHPF process.

In another embodiment, a method for making cam shafts, by linking cam rings to a hollow shaft in an IHPF (Internal High Pressure Forming) process, the hollow shaft being deformed in said IHPF process to form said cam shaft is provided, comprising the steps of providing cam rings of even thickness, the outer surface of the cam rings being surface-harden to produce a defined thickness area that is hard and elastic and to a minor extent plastically deformable, with the area below being plastically deformable, wherein the surface-hardened cam rings show a permissible residual expansion of $<=0.5\%$, and providing the hollow shaft in form of a tube made from a material that is plastically deformable, and joining the surface-hardened cam rings and the hollow shaft in the IHPF process by internal pressure, whereby the hollow shaft is deformed to form cams under the hardened cam rings and the cam rings are secured on the hollow shaft in a force- and form-closing manner. In a more particular embodiment the surface hardening is in a one step process.

In a more particularized form of the embodiment, the cam rings are provided in their function-related contour, and the material of the cam rings is a low-alloyed spring steel.

In another embodiment, the spring steel is 58 CrMo V4.

In yet another embodiment, a cam shaft manufactured according to the method is provided, wherein said cam rings of even thickness are made with appropriate contours in a separate process with the defined outer thickness area that is hard and elastic and to a minor extent plastically deformable, with the area below being plastically deformable, and wherein the hollow shaft provides cams at the sites of the cam rings.

In another embodiment, the cam shaft the cam rings have a permissible residual expansion of $>=0.5\%$.

In yet another embodiment, the cam shaft further comprises one or more gearwheels, sprockets or similar force-transmitting functional elements.

In another embodiment, the gearwheels, sprockets or similar force-transmitting functional elements possess over a defined thickness from the root circle towards the inside an elastically deformable layer.

Based on an application example a camshaft manufactured in accordance with the invention is described hereinafter.

DETAILED DESCRIPTION

Figure 1:
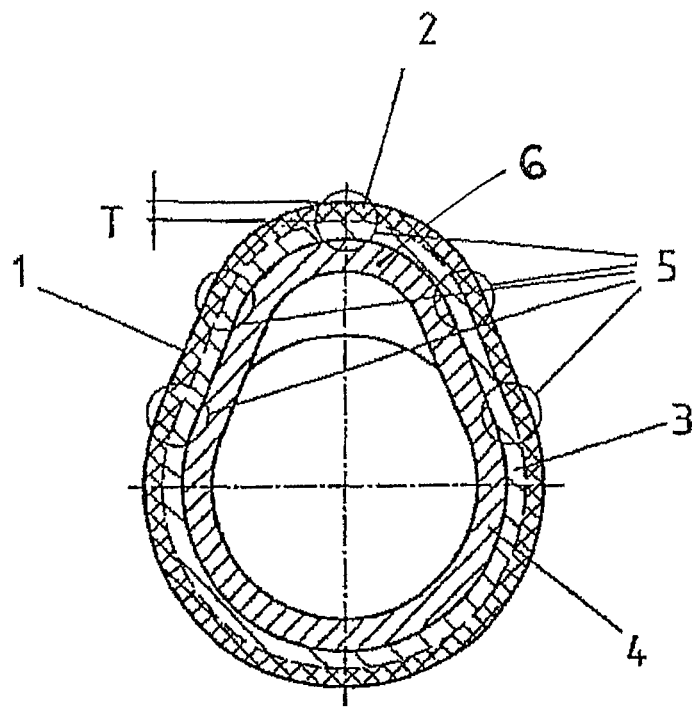
FIG. 1: shows a cross section through a camshaft in the area of a cam of identical wall thickness.
Figure 2:
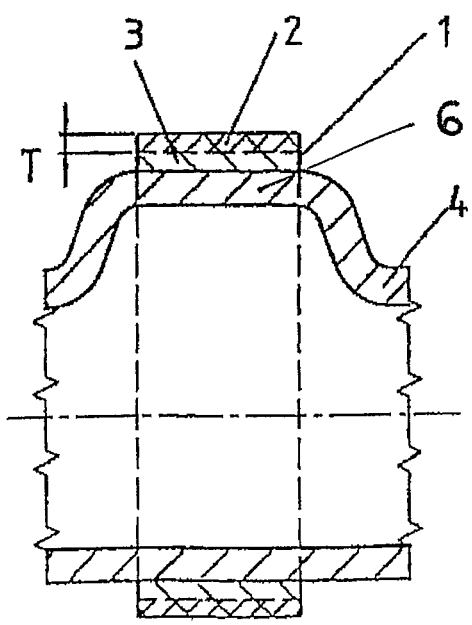
FIG. 2: shows a longitudinal section through a camshaft.

In FIGS. 1 and 2 the cam rings 1 are manufactured according to a separate known mechanical process with their contours formed to suit the respective function. For this purpose material 58 CrMoV6 is used. Following this the cam rings 1 are surface hardened in a known manner. This hardening process is controlled such that in a depth T a hardened layer 2 develops that is elastically deformable and still permits the material to be slightly plastically deformed. The area 3 located below layer 2 remains non-hardened, that is it can be deformed both plastically and elastically. The cam ring 1 is mounted on a hollow shaft in a force- and form-closing manner with the aid of the known IHPF process. The hollow shaft 4, originally a tube, consists of a rotationally symmetrical material that is plastically deformable.

In one embodiment, the cam rings have an even thickness (see FIGS. 1 and 2).

FIGS. 1 and 2 also show cams 9 are formed under the hardened cam rings by deforming the hollow shaft. This contrasts with convention methods where cams are not actually formed in the deformed shaft but instead cam rings merely secured.

The area where deficiencies occurred through crack formation in processes according to prior art has been marked 5 and is eliminated by the method in accordance with the present invention.

Figure 3:
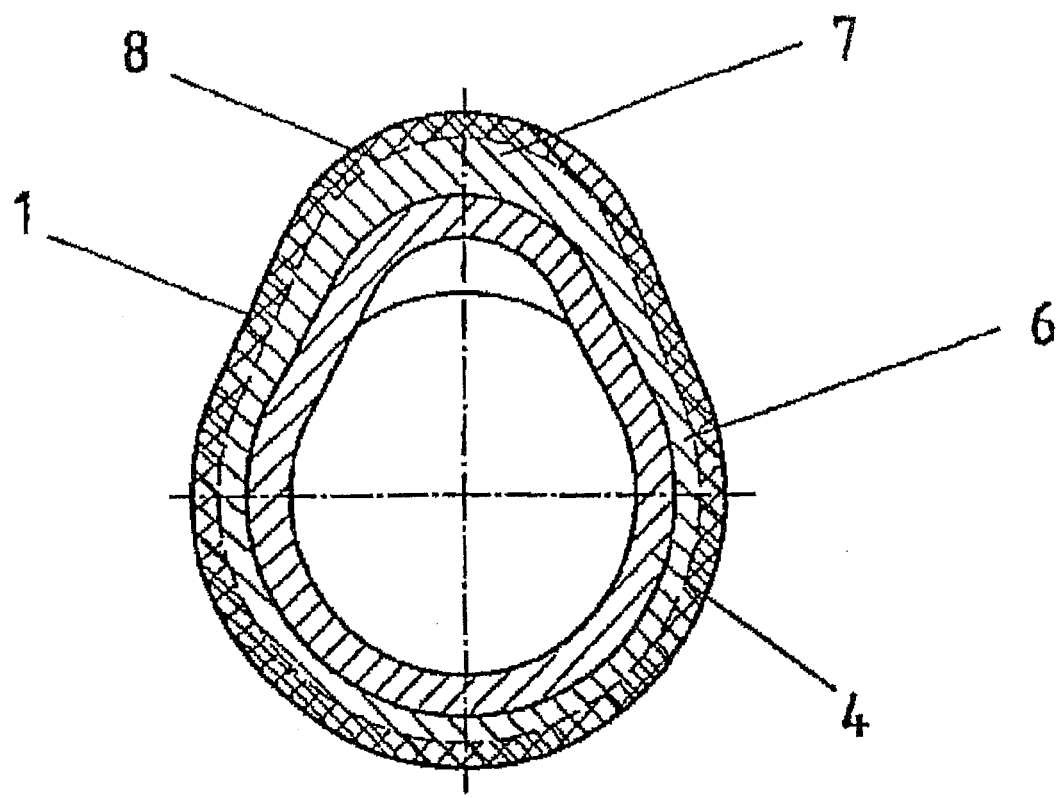
FIG. 3: shows a cross section through a camshaft in the area of a cam consisting of two materials and having different wall thicknesses.

The cam rings 1 in FIG. 3 consist of an inner ring 6 directly mounted onto hollow shaft 4, said ring being made of a soft, plastically deformable material. In the area of the cam tip 7 the ring is considerably thicker than in its remaining portions. On this ring 6 an existing ring 8 of invariable thickness is arranged that consists of a hard, elastically deformable material. Its outer contour has been designed so as to suit the respective function.

Both rings 6 and 8 are joined with each other before being placed into the IHPF tool in a force- and form-closing manner, for example by a shrink-on technique.

The invention claimed is:

1. A method for making cam shafts, by linking cam rings to a hollow shaft in an IHPF (Internal High Pressure Forming) process, the hollow shaft being deformed in said IHPF process to form a cam shaft, comprising the steps of
providing surface-hardened cam rings of even thickness, an outer surface of each cam ring being hardened to produce a defined thickness area that is hard and elastic and to a minor extent plastically deformable, with an area below being plastically deformable, wherein the surface-hardened cam rings show a permissible residual expansion of $>=0.5\%$, and
providing the hollow shaft in form of a tube made from a material that is plastically deformable, and
joining the surface-hardened cam rings and the hollow shaft in the IHPF process by internal pressure, whereby the hollow shaft is deformed to form cams under the surface-hardened cam rings and the surface-hardened cam rings are secured on the hollow shaft in a force-and form-closing manner,
wherein the surface hardened cam rings are made from a low-alloyed spring steel.

2. The method of claim 1, wherein the surface-hardened cam rings are provided in their function-related contour.

3. The method of claim 2, wherein the spring steel is 58 CrMo V4.

4. The method of claim 1, wherein the spring steel is 58 CrMo V4.

5. The method of claim 1, wherein the outer surface of each cam ring is hardened in a one step process.

* * * * *